US012756471B2

(12) United States Patent
Kaneko et al.

(10) Patent No.: US 12,756,471 B2
(45) Date of Patent: Oct. 6, 2026

(54) OPTICAL COMMUNICATION SYSTEM, OPTICAL TRANSMITTING AND RECEIVING APPARATUS, AND OPTICAL COMMUNICATION METHOD

(71) Applicant: NTT, Inc., Tokyo (JP)

(72) Inventors: Shin Kaneko, Musashino (JP); Junichi Kani, Musashino (JP); Kazutaka Hara, Musashino (JP); Takuya Kanai, Musashino (JP)

(73) Assignee: NTT, Inc., Tokyo (JP)

( * ) Notice: Subject to any disclaimer, the term of this patent is extended or adjusted under 35 U.S.C. 154(b) by 72 days.

(21) Appl. No.: 18/285,926

(22) PCT Filed: Apr. 14, 2021

(86) PCT No.: PCT/JP2021/015407

§ 371 (c)(1),
(2) Date: Oct. 6, 2023

(87) PCT Pub. No.: WO2022/219738

PCT Pub. Date: Oct. 20, 2022

(65) Prior Publication Data

US 2024/0187099 A1 Jun. 6, 2024

(51) Int. Cl.
*H04B 10/27* (2013.01)
*H04B 10/58* (2013.01)

(52) U.S. Cl.
CPC ............. *H04B 10/27* (2013.01); *H04B 10/58* (2013.01)

(58) Field of Classification Search
CPC ................................ H04B 10/27; H04B 10/58
See application file for complete search history.

(56) References Cited

U.S. PATENT DOCUMENTS 5,500,756 A 3/1996 Tsushima et al.
5,894,362 A 4/1999 Onaka et al.
(Continued)

FOREIGN PATENT DOCUMENTS

JP H05130058 A 5/1993
JP 2001160820 A 6/2001
(Continued)

OTHER PUBLICATIONS

Takuya Kanai et al., Photonic Gateway for All-Photonics Network, B-8-20, p. 141, Mar. 2021, IEICE.
(Continued)

*Primary Examiner* — Pranesh K Barua
(74) *Attorney, Agent, or Firm* — Harness, Dickey & Pierce, P.L.C.

(57) ABSTRACT

An optical switch receives an input of an optical signal which has been transmitted by a first optical communication device from a first port, and outputs the optical signal from a second port connected to a first optical transmission line included in an optical route in which an optical path between the first optical communication device and a second optical communication device is set. An optical branching unit branches a part of the optical signal which has been transmitted through the first optical transmission line, and outputs the branched optical signal to a second optical transmission line. An optical transmitting and receiving apparatus includes a reception unit, a transmission unit, and a light cutoff unit. The reception unit receives an input of the optical signal which has been branched by the optical branching unit from the second optical transmission line, and acquires a signal addressed to a destination different from the second optical communication device from the input optical signal. The transmission unit generates an optical signal using light emitted by a light source. The light cutoff unit prevents the
(Continued)

light from the light source from being input to the second optical transmission line.

5 Claims, 5 Drawing Sheets

(56) References Cited

U.S. PATENT DOCUMENTS

| | | | | | |
|---|---|---|---|---|---|
| 6,137,613 | A * | 10/2000 | Ushirozawa | H04B 10/505 398/1 |
| 6,335,810 | B1 | 1/2002 | Uehara | |
| 6,891,995 | B2 * | 5/2005 | Ikushima | H04J 14/02 398/43 |
| 8,886,036 | B2 * | 11/2014 | Jeong | H04B 10/0773 398/79 |
| 9,071,378 | B2 | 6/2015 | Hoshida | |
| 10,797,799 | B2 | 10/2020 | Nakagawa et al. | |
| 2002/0101635 | A1 | 8/2002 | Taketomi | |
| 2006/0133806 | A1 | 6/2006 | Krimmel | |
| 2008/0166119 | A1 * | 7/2008 | Ryu | H04B 10/0793 398/17 |
| 2008/0166122 | A1 * | 7/2008 | Hsiao | H04B 10/032 398/48 |
| 2010/0086304 | A1 * | 4/2010 | Mizutani | H04J 14/0282 398/71 |
| 2011/0116798 | A1 * | 5/2011 | Kai | H04Q 11/0067 398/58 |
| 2012/0148239 | A1 | 6/2012 | Mori et al. | |
| 2013/0315583 | A1 * | 11/2013 | Komiya | H04J 14/0212 398/19 |
| 2015/0229389 | A1 * | 8/2015 | Kim | H04B 10/073 398/17 |
| 2017/0155981 | A1 | 6/2017 | Nakagawa et al. | |
| 2017/0279538 | A1 * | 9/2017 | Sone | H04B 10/572 |
| 2018/0359024 | A1 | 12/2018 | Oda et al. | |
| 2019/0058541 | A1 | 2/2019 | Abe | |
| 2020/0136722 | A1 * | 4/2020 | Urban | H04B 10/0779 |
| 2020/0313762 | A1 * | 10/2020 | Ugajin | H04Q 11/0005 |
| 2021/0083778 | A1 | 3/2021 | Honda et al. | |

FOREIGN PATENT DOCUMENTS

| | | | |
|---|---|---|---|
| JP | 2006-319894 | A | 11/2006 |
| JP | 2012124731 | A | 6/2012 |
| JP | 2014049775 | A | 3/2014 |
| JP | 2014165574 | A | 9/2014 |
| JP | 2016105548 | A | 6/2016 |
| WO | WO-2012154388 | A1 | 11/2012 |
| WO | WO-2017090611 | A1 | 6/2017 |
| WO | 2017/159519 | A1 | 9/2017 |
| WO | WO-2018/003095 | A1 | 1/2018 |
| WO | 2019/167797 | A1 | 9/2019 |

OTHER PUBLICATIONS

ITU-T G.989.2 Recommendation, "40-Gigabit-capable-passive optical networks 2(NG PON2): Physical media dependent (PMD) layer specification," Feb. 2019.

Y.Luo, et al., "Physical Layer Aspects of NG-PON2 Standards-Part 2: System Design and Technology Feasibility [Invited]" J.Opt. Com-mum. Netw., 8(1), pp. 43-52, Jan. 2016.

Masamichi Fujiwara, et al., "Increasing Splitting Ratio of 10Gb/s-Class PONs by Using FW-DMF that Acts as Low Loss Splitter for Upstream and Conventional Splitter for Downstream", OFC, Tu2C, 2014.

Nakagawa Goji et al: "Development of Evaluation Platform of AMCC Superimposition on CPRI Signal Transmission for Mobile Fronthaul Network", 2017.

* cited by examiner

OPTICAL COMMUNICATION SYSTEM, OPTICAL TRANSMITTING AND RECEIVING APPARATUS, AND OPTICAL COMMUNICATION METHOD

CROSS-REFERENCE TO RELATED APPLICATIONS

This application is a 371 U.S. National Phase of International Application No. PCT/JP2021/015407, filed on Apr. 14, 2021. The entire disclosure of the above application is incorporated herein by reference.

TECHNICAL FIELD

The present invention relates to an optical communication system, an optical transmitting and receiving apparatus, and an optical communication method.

BACKGROUND ART

An optical communication system relays optical signals between subscriber devices. FIG. 5 is a diagram illustrating a configuration example of a conventional optical communication system. The subscriber devices are connected via one or more optical switches (SWs). In addition, the optical SWs are connected via an optical communication network (NW). FIG. 5 illustrates an example in which there are two optical SWs. Each of the optical SWs is an optical switching means that outputs signal light input from a port to another port. The another port to which the signal light is output is a connection port in which a connection relationship is set with respect to the port to which the signal light is input. Specifically, each of the optical SWs includes a plurality of first ports and a plurality of second ports. The first ports are connected to subscriber devices via optical fiber transmission lines. The second ports are connected to a control unit or the optical communication NW via optical fiber transmission lines. Each of the optical SWs outputs an optical signal input from a first port to a second port with which a connection relationship is set, and outputs an optical signal input from a second port from a first port with which a connection relationship is set. The connection relationships between the ports can be arbitrarily set and changed.

Hereinafter, the two optical SWs will be referred to as an optical SW #1 and an optical SW #2, and a subscriber device connected to an optical SW #n (n is an integer of 1 or more and N or less) will be referred to as a subscriber device #kn-n (kn is an integer of 1 or more).

An optical path opening method for connecting a subscriber device #k1-1 to a subscriber device #k2-2 as a communication partner via optical fiber transmission lines and the optical SWs will be described with reference to FIG. 5 by use of a case of k1-1 and k2-1 as an example. An optical SW control unit of the control unit sets inter-port connection of the optical SW #1 such that the subscriber device #1-1 communicates with a subscriber device management control unit at the time of initial connection of the subscriber device #1-1. At this time, information necessary for registration and authentication of the subscriber device #1-1 is transmitted and received between the subscriber device #1-1 and the subscriber device management control unit, and an instruction on a light emission wavelength to be used is transmitted from the subscriber device management control unit to the subscriber device #1-1. As a channel for transmitting and receiving such management control information, an auxiliary management and control channel (AMCC) can be used.

As soon as the subscriber device management control unit completes the registration and authentication of the subscriber device #1-1, the setting of the wavelength, and the like, the optical SW control unit changes the setting of the inter-port connection of the optical SW #1. Specifically, the optical SW control unit changes the setting of the inter-port connection such that an optical signal transmitted from the subscriber device #1-1 is transferred to the subscriber device #1-2 as the communication partner. As a result, it is possible to open an optical path directly connecting the subscriber device #1-1 and the subscriber device #1-2.

CITATION LIST

Non Patent Literature

Non Patent Literature 1: Takuya Kanai and six others, "Photonic Gateway Supporting All-Photonics Network", The Institute of Electronics, Information and Communication Engineers General Conference, B-8-20, p. 141, March 2021

SUMMARY OF INVENTION

Technical Problem

In the configuration of the conventional optical communication system, there is no control channel for transmitting a control signal from a subscriber device to a control unit once an optical path is opened. Therefore, the subscriber device cannot transmit a request to the control unit.

In view of the above circumstances, an object of the present invention is to provide an optical communication system, an optical transmitting and receiving apparatus, and an optical communication method capable of transmitting a signal to a device different from a communication partner device while a signal is transmitted and received by use of an optical path to the communication partner device.

Solution to Problem

An optical communication system according to an aspect of the present invention includes: an optical switch that inputs an optical signal which has been transmitted by a first optical communication device from a first port, and outputs the optical signal from a second port connected to a first optical transmission line included in an optical route in which an optical path between the first optical communication device and a second optical communication device is set; an optical branching unit (hereinafter also referred to as "optical bancher") that branches a part of the optical signal which has been transmitted through the first optical transmission line, and outputs the branched optical signal to a second optical transmission line; and an optical transmitting and receiving apparatus that inputs the optical signal which has been branched by the optical branching unit from the second optical transmission line, and the optical transmitting and receiving apparatus includes: a reception unit (hereinafter also referred to as "receiver") that acquires a signal addressed to a destination different from the second optical communication device from the optical signal which has been input from the second optical transmission line; a transmission unit (hereinafter also referred to as "transmitter") that generates an optical signal by use of light emitted by a light source; and a cutoff unit that prevents the light emitted by the light source from being input to the second optical transmission line.

An optical transmitting and receiving apparatus according to an aspect of the present invention includes: a reception unit that inputs an optical signal which has been obtained by an optical branching unit branching a part of an optical signal having been transmitted from a first optical communication device from a second optical transmission line, and acquires a signal addressed to a destination different from a second optical communication device from the input optical signal, the optical branching unit being provided on a first optical transmission line included in an optical route in which an optical path between the first optical communication device and the second optical communication device is set; a transmission unit that generates an optical signal by use of light emitted by a light source; and a cutoff unit that prevents the light emitted by the light source from being input to the second optical transmission line.

An optical transmitting and receiving apparatus according to an aspect of the present invention includes: a reception unit that inputs an optical signal having been transmitted by a communication destination device, which is an optical communication device as a communication destination, from an optical transmission line, and receives the input optical signal; and a transmission unit that generates an optical signal carrying a first signal addressed to the communication destination device and a second signal addressed to a destination different from the communication destination device, and outputs the optical signal to the optical transmission line.

An optical communication method according to an aspect of the present invention includes: a switching step in which an optical signal which has been transmitted by a first optical communication device is input from a first port to an optical switch, and the optical signal is output from a second port connected to a first optical transmission line included in an optical route in which an optical path between the first optical communication device and a second optical communication device is set; a branching step in which an optical branching unit branches a part of the optical signal which has been transmitted through the first optical transmission line and outputs the branched optical signal to a second optical transmission line; a reception step in which the optical signal which has been branched by the optical branching unit is input from the second optical transmission line to a reception unit of an optical transmitting and receiving apparatus, and the reception unit acquires a signal addressed to a destination different from the second optical communication device from the input optical signal; and a cutoff step in which a cutoff unit of the optical transmitting and receiving apparatus prevents light from a light source, which is used by a transmission unit of the optical transmitting and receiving apparatus to transmit an optical signal, from being input to the second optical transmission line.

An optical communication method according to an aspect of the present invention includes: a reception step in which an optical signal which has been obtained by an optical branching unit branching a part of an optical signal having been transmitted from a first optical communication device is input from a second optical transmission line to a reception unit, and the reception unit acquires a signal addressed to a destination different from a second optical communication device from the input optical signal, the optical branching unit being provided on a first optical transmission line included in an optical route in which an optical path between the first optical communication device and the second optical communication device is set; and a cutoff step in which a cutoff unit prevents light from a light source, which is used by a transmission unit to transmit an optical signal, from being input to the second optical transmission line.

An optical communication method according to an aspect of the present invention includes: a reception step in which an optical signal having been transmitted by a communication destination device, which is an optical communication device as a communication destination, is input from an optical transmission line to a reception unit, and the reception unit receives the input optical signal; and a transmission step in which a transmission unit generates an optical signal carrying a first signal addressed to the communication destination device and a second signal addressed to a destination different from the communication destination device, and outputs the optical signal to the optical transmission line.

Advantageous Effects of Invention

According to the present invention, it is possible to transmit a signal to a device different from a communication partner device while a signal is transmitted and received by use of an optical path to the communication partner device.

DESCRIPTION OF EMBODIMENTS

Figure 1:
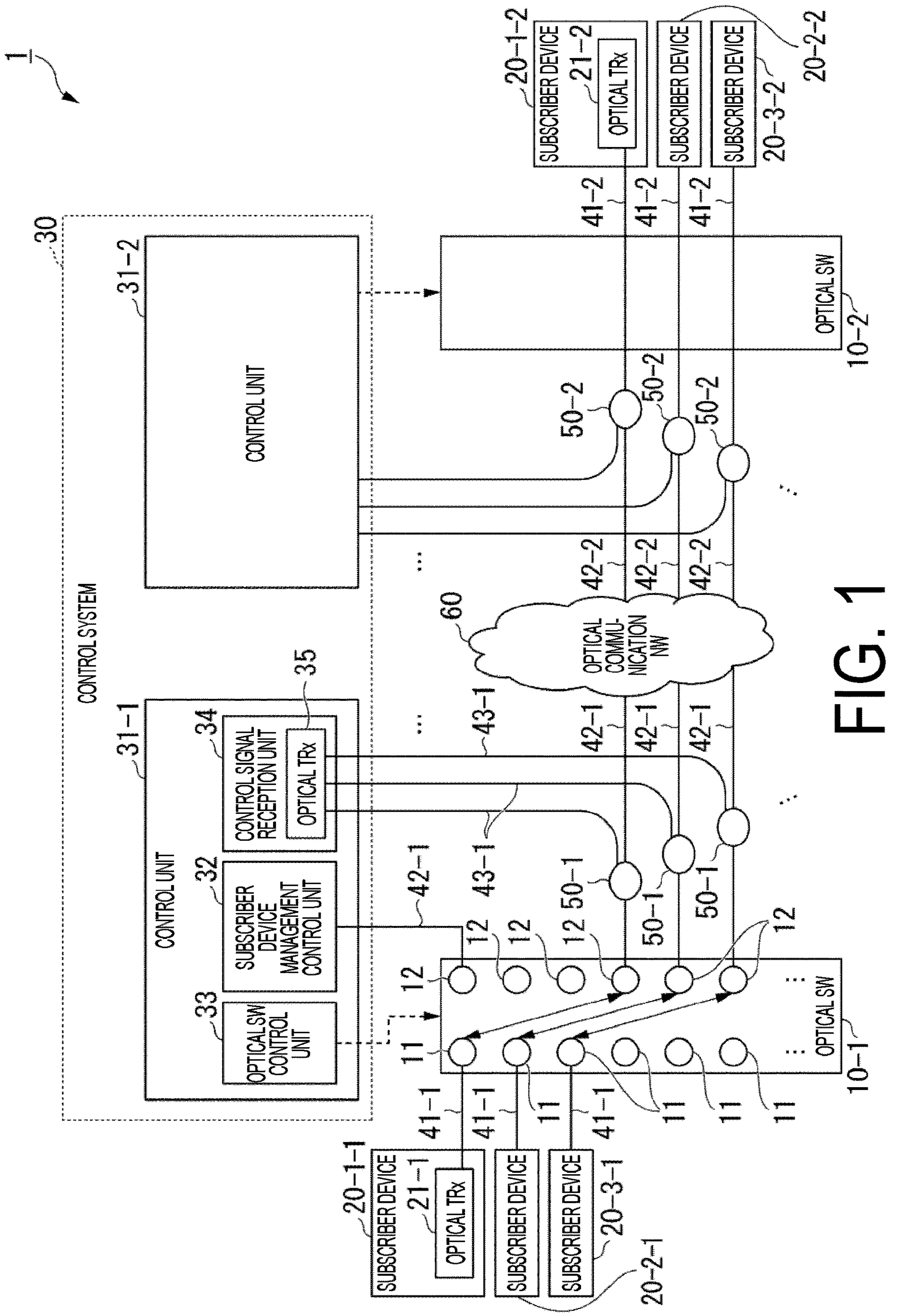
FIG. 1 is a diagram illustrating a configuration example of an optical communication system according to an embodiment of the present invention.

Hereinafter, an embodiment of the present invention will be described in detail with reference to the drawings. Note that, in the drawings, the same parts are denoted by the same reference signs, and the description thereof will be omitted.

Figure 5:
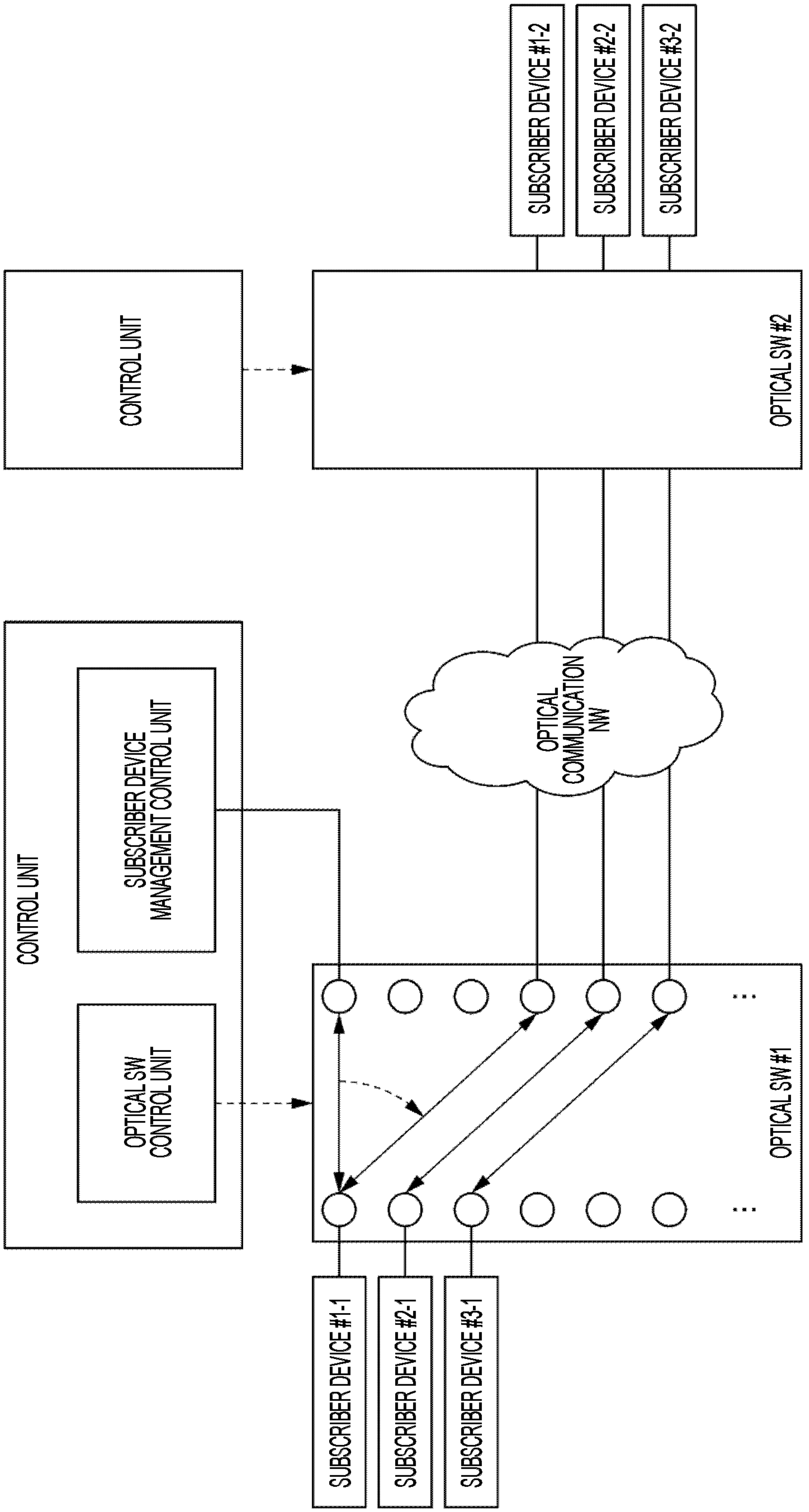
FIG. 5 is a diagram illustrating a configuration example of a conventional optical communication system.
Figure 6:
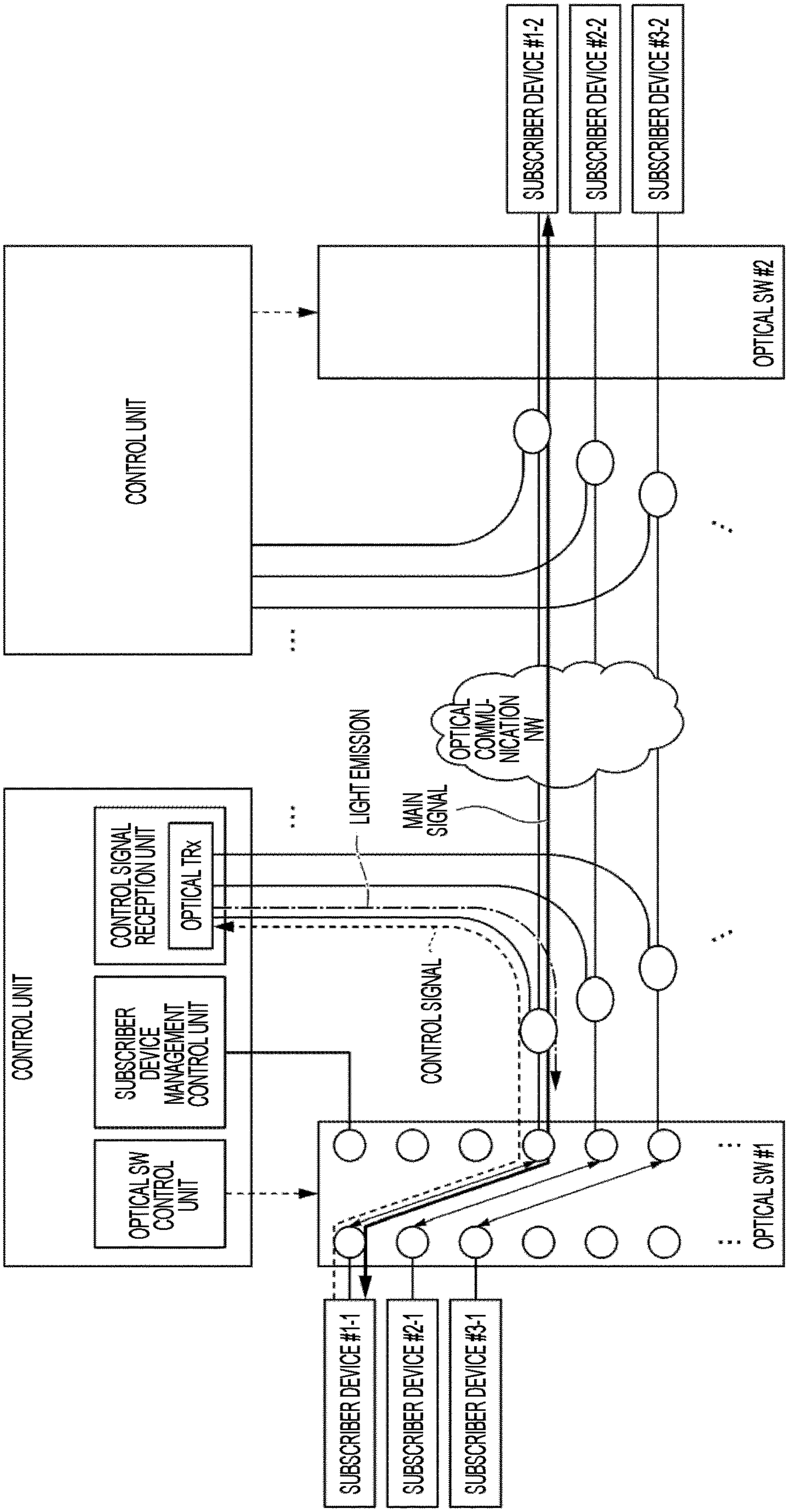
FIG. 6 is a diagram illustrating a configuration example of an optical communication system.

In the configuration of the conventional optical communication system illustrated in FIG. 5, a subscriber device cannot transmit a request to a control unit once an optical path is opened. Therefore, a configuration of an optical communication system illustrated in FIG. 6 can be considered. In the optical communication system illustrated in FIG. 6, an optical branching unit is installed on a transmission line between an optical SW #1 and an optical communication NW. The optical branching unit branches the power of an optical signal which has been output from a subscriber device #k1-1 and outputs the branched optical signal to a control unit. With this configuration, in a case where the subscriber device outputs a control signal for transmitting a request to the control unit, the control signal is input to the control unit. A control signal reception unit of the control unit receives the control signal included in the optical signal which has been branched by the optical branching unit.

However, when an optical transceiver (TRx) of the control signal reception unit emits light, the light may merge with a main signal through the optical branching unit and interfere with the main signal. Specifically, light carrying the main signal from a subscriber device #1-2 to the subscriber device #1-1 and light emitted from the optical transceiver of the control signal reception unit merge at the optical branching unit. When the wavelength of the light carrying the main signal is the same as the wavelength of the light from the optical transceiver, interference occurs regardless of the frequency of the signal carrying the main signal. Therefore, the subscriber device #1-1 cannot correctly receive the main signal. Therefore, it is desirable to transmit a signal to a control unit different from a subscriber device as a communication partner while reducing an influence on a signal transmitted and received by use of an optical path to the communication partner device.

FIG. 1 is a diagram illustrating a configuration example of an optical communication system 1 according to the embodiment of the present invention. The optical communication system 1 includes N (N is an integer of 1 or more) optical SWs 10, subscriber devices 20, and a control system 30. As each of the optical SWs 10, a conventional optical SW illustrated in FIG. 5 can be used. FIG. 1 illustrates a case of N=2 as an example. An n-th (n is an integer of 1 or more and N or less) optical SW 10 will be referred to as an optical SW 10-*n*. The control system 30 includes one or more control units 31. In the present embodiment, a control unit 31 connected to the optical SW 10-*n* will be referred to as a control unit 31-*n*. Note that one control unit 31 may be connected to two or more optical SWs 10.

Each of the optical SWs 10 includes a plurality of first ports 11 and a plurality of second ports 12. The first ports 11 are connected to the subscriber devices 20 via optical fiber transmission lines 41. The second ports 12 are connected to one control unit 31 or an optical communication network (NW) 60 via optical fiber transmission lines 42. Each of the optical SWs 10 outputs an optical signal input from one first port 11 to one second port 12 with which a connection relationship is set, and outputs an optical signal input from one second port 12 from one first port 11 with which a connection relationship is set. The connection relationships between the ports can be arbitrarily changed and set.

One subscriber device 20 transmits and receives an optical signal to and from a communication destination device, which is another subscriber device 20 as a communication partner. Each of the subscriber devices 20 includes an optical transceiver (TRx) 21. Each of the optical transceivers 21 is an auxiliary management and control channel (AMCC)-compatible optical TRx. The AMCC-compatible TRx is an optical transceiver having a function of transmitting and receiving a control signal by AMCC. An AMCC signal and a main signal use different frequencies in the electrical area, and the AMCC signal and the main signal use the same wavelength in the optical area. For example, the optical transceiver 21 combines an electrical main signal and an electrical AMCC signal, and converts the combined signal into an optical signal, thereby generating a high-speed main signal on which the AMCC signal having a low frequency is superimposed. Note that the optical transceiver 21 may generate an optical signal on which only the main signal is carried and the control signal is not superimposed, or may generate an optical signal on which the main signal is not carried and the control signal is carried. The optical transceiver 21 outputs the generated optical signal to a corresponding one of the optical fiber transmission lines 41, and receives an optical signal output by a corresponding one of the optical SWs 10 to the optical fiber transmission line 41. Hereinafter, a kn-th (kn is an integer of 1 or more) subscriber device 20 connected to the optical SW 10-*n* will be referred to as a subscriber device 20-*kn*-*n*, and an optical transceiver 21 included in the subscriber device 20-*kn*-*n* will be referred to as an optical transceiver 21-*n*.

The optical fiber transmission lines 42 that connect the optical SWs 10 and the optical communication network 60 are provided with optical branching units 50. The optical branching units 50 are connected to the control units 31 by optical fiber transmission lines 43. Each of the optical branching units 50 branches a part of an optical signal which has been transmitted through a corresponding one of the optical fiber transmission lines 42 and outputs the branched part to a corresponding one of the optical fiber transmission lines 43. The optical branching unit 50 is, for example, an optical coupler. Hereinafter, optical fiber transmission lines 42 connected to the optical SW 10-*n* will be referred to as optical fiber transmission lines 42-*n*, optical branching units 50 provided on the optical fiber transmission lines 42-*n* will be referred to as optical branching units 50-*n*, and optical fiber transmission lines 43 connected to the optical branching units 50-*n* will be referred to as optical fiber transmission lines 43-*n*.

Each of the control units 31 of the control system 30 includes a subscriber device management control unit 32, an optical SW control unit 33, and a control signal reception unit 34. The subscriber device management control unit 32 is connected to the second ports 12 of a corresponding one of the optical SWs 10 via the optical fiber transmission lines 42. The subscriber device management control unit 32 transmits and receives information necessary for registration and authentication of one subscriber device 20 before the subscriber device 20 starts optical communication with a communication destination device. In addition, the subscriber device management control unit 32 determines an optical route from the subscriber device 20 to the communication destination device, and allocates a resource such as a wavelength to be used for communication with the communication destination device to the subscriber device 20.

The optical SW control unit 33 determines inter-port connection of the optical SW 10 according to the optical route allocated to the subscriber device 20 by the subscriber device management control unit 32. The inter-port connection is a connection relationship indicating to which of the second ports 12 an optical signal input from one first port 11 is connected and to which of the first ports 11 an optical signal input from one second port 12 is output. The optical SW control unit 33 controls the optical SW 10 to switch the optical signals according to the determined inter-port connection.

The control signal reception unit 34 is connected to the optical branching units 50 via the optical fiber transmission lines 43. The control signal reception unit 34 includes an optical transceiver (TRx) 35. The optical transceiver 35 is an AMCC-compatible TR. The optical transceiver 35 receives an optical signal which has been branched by one of the optical branching units 50, and extracts a control signal as an AMCC signal from the received optical signal. The control signal reception unit 34 performs predetermined processing on the basis of the control signal which has been extracted by the optical transceiver 35.

Next, a configuration example of the optical transceiver 35 will be described.

Figure 2:
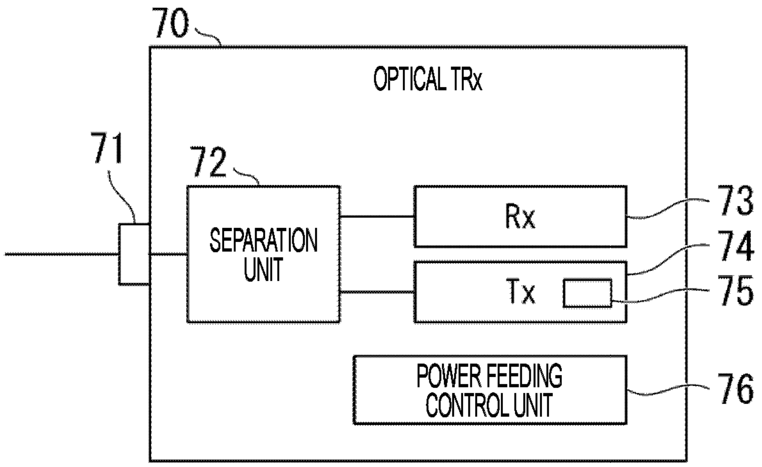
FIG. 2 is a diagram illustrating a configuration example of an optical transceiver according to the embodiment.

FIG. 2 is a diagram illustrating a configuration example of a single-core optical transceiver 70. In FIG. 2, only functional units related to the present embodiment are extracted and illustrated. The optical transceiver 70 is used as the optical transceiver 35. The optical transceiver 70 includes a port 71, a separation unit 72, a receiver (Rx) 73, a transmitter (Tx) 74, and a power feeding control unit 76. The port 71 receives an input of an optical signal from one of the optical fiber transmission lines 43, outputs the optical signal to the separation unit 72, and outputs an optical signal output from the separation unit 72 to the optical fiber transmission line 43. The separation unit 72 separates the optical signal by wavelength. The separation unit 72 outputs the optical signal which has been input by the port 71 from the optical fiber transmission line 43 to the receiver 73, and outputs an optical signal which has been output by the transmitter 74 from the port 71 to the optical fiber transmission line 43. The receiver 73 receives the optical signal which has been separated by the separation unit 72 and converts the optical signal into an electrical signal. A wavelength filter that allows an optical signal having a wavelength received by the receiver 73 to pass therethrough may be provided between the receiver 73 and the separation unit 72. The transmitter 74 includes a light source 75. The transmitter 74 generates an optical signal by modulating light emitted by the light source 75 with an electrical signal. The transmitter 74 outputs the generated optical signal to the separation unit 72. The light source 75 may be a wavelength-tunable light source. The power feeding control unit 76 controls whether or not to supply a current to the light source 75.

Figure 3:
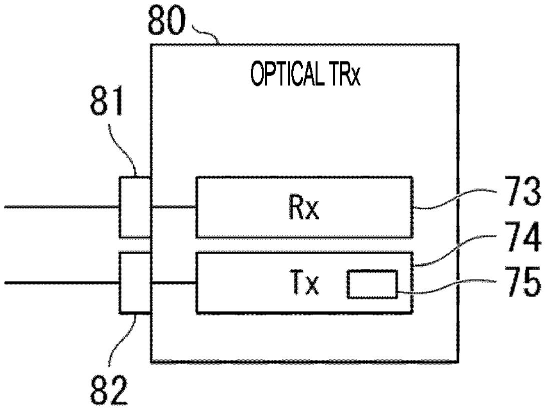
FIG. 3 is a diagram illustrating a configuration example of an optical transceiver according to the embodiment.

FIG. 3 is a diagram illustrating a configuration example of a two-core optical transceiver 80. In FIG. 3, only functional units related to the present embodiment are extracted and illustrated. The optical transceiver 80 is used as the optical transceiver 35. In FIG. 3, the same parts as those of the optical transceiver 70 illustrated in FIG. 2 are denoted by the same reference signs, and the description thereof will be omitted. The optical transceiver 80 includes an input port 81, an output port 82, a receiver 73, and a transmitter 74. The input port 81 receives an input of an optical signal from one of the optical fiber transmission lines 43 and outputs the optical signal to the receiver 73. A wavelength filter that allows an optical signal having a wavelength received by the receiver 73 to pass therethrough may be provided between the input port 81 and the receiver 73. The output port 82 outputs an optical signal output by the transmitter 74 to the optical fiber transmission line 43.

A conventional optical transceiver can receive an optical signal in a linkup state in which a signal transmitted by an optical communication device into which the optical transceiver is inserted is reaching another optical communication device into which another optical transceiver is inserted, which serves as a communication destination. The optical transceiver 35 according to the present embodiment can receive an optical signal regardless of whether or not an optical communication device into which the optical transceiver 35 is inserted is in the linkup state. That is, the optical transceiver 35 can receive the optical signal even in a state where an optical signal transmitted by the optical transceiver 35 is not reaching another optical transceiver.

Each of the optical transceivers 21 included in the subscriber devices 20 can also have a configuration similar to that of the optical transceiver 70 illustrated in FIG. 2 or the optical transceiver 80 illustrated in FIG. 3. By using the wavelength-tunable light source as the light source 75, the transmitter 74 can transmit an optical signal having a wavelength allocated by the subscriber device management control unit 32. The optical transceiver 21 is an optical transceiver capable of transmitting a control signal regardless of whether or not a control signal is received from another optical transceiver. The optical transceiver 21 can transmit a control signal to the optical transceiver 35 even in a state where the optical transceiver 21 cannot receive a signal from the optical transceiver 35.

Figure 4:
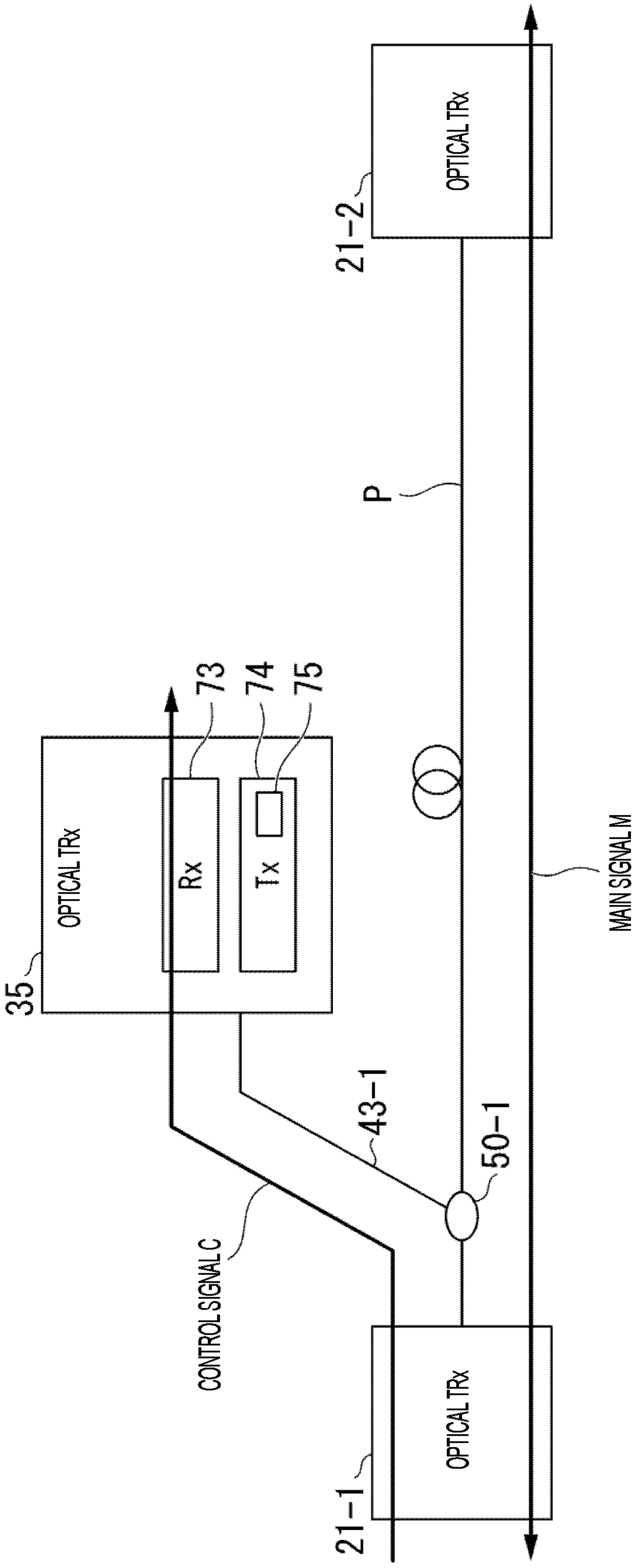
FIG. 4 is a diagram illustrating a connection relationship among optical transceivers in the optical communication system according to the embodiment.

FIG. 4 is a diagram illustrating a connection relationship among the optical transceiver 21-*n* of the subscriber device 20-*kn*-*n* illustrated in FIG. 1, an optical transceiver 21-*m* of a subscriber device 20-*km*-*m* (m is an integer of 1 or more and N or less, and km is an integer of 1 or more), and the optical transceiver 35 included in the control signal reception unit 34 of the control unit 31-*n*. Note that a control signal C and a main signal M illustrated in FIG. 4 each indicate a relationship between a transmission source and a transmission destination of the signal, and do not indicate an optical signal.

Hereinafter, the operation of the optical communication system 1 will be described with reference to FIGS. 1 and 4 by use of a case of n=1 and m=2 as an example.

The optical communication system 1 opens an optical path P between a subscriber device 20-*k*1-1 and a subscriber device 20-*k*2-2 by a procedure similar to that in the conventional technique. That is, the optical SW control unit 33 of the control unit 31-1 sets inter-port connection between the first port 11 connected to the subscriber device #k1-1 and the second port 12 connected to the subscriber device management control unit 32 in an optical SW 10-1. The subscriber device management control unit 32 performs registration and authentication on the basis of information received from the subscriber device 20-*k*1-1. Furthermore, the subscriber device management control unit 32 determines an optical route between the subscriber device 20-*k*1-1 and the subscriber device 20-*k*2-2 as a communication destination of which the subscriber device 20-*k*1-1 has notified the subscriber device management control unit 32, and allocates a wavelength to be used. The subscriber device management control unit 32 notifies the subscriber device 20-*k*1-1 of the wavelength allocated to the subscriber device 20-*k*1-1. The optical SW control unit 33 changes the setting of the optical SW 10-1 so as to perform inter-port connection according to the optical route determined by the subscriber device management control unit 32. As a result, it is possible to open the optical path P directly connecting the subscriber device #k1-1 and the subscriber device #k2-2. The optical route of the optical path P includes an optical fiber transmission line 41-1, the optical SW 10-1, an optical fiber transmission line 42-1, the optical communication NW 60, an optical fiber transmission line 42-2, an optical SW 10-2, and an optical fiber transmission line 41-2.

An optical transceiver 21-1 of the subscriber device 20-*k*1-1 and an optical transceiver 21-2 of the subscriber device 20-*k*2-2 transmit and receive optical signals via the optical route of the optical path P. The optical transceiver 21-1 converts an electrical main signal M addressed to the subscriber device 20-*k*2-2 into an optical signal and outputs the optical signal to the optical route of the optical path P. When transmitting a control signal C to the control unit 31-*n*, the optical transceiver 21-1 generates an optical signal on which the electrical main signal M addressed to the subscriber device 20-*k*2-2 and the electrical control signal C addressed to the control unit 31-*n* are superimposed, and outputs the optical signal to the optical route of the optical path P.

The optical branching unit 50 provided on the optical fiber transmission line 42-1 included in the optical route of the optical path P branches the optical signal which has been transmitted through the optical fiber transmission line 42-1 and outputs the branched optical signal to an optical fiber transmission line 43-1. The optical transceiver 35 included in the control signal reception unit 34 of the control unit 31-1 receives an input of the optical signal from the optical fiber transmission line 43-1. The receiver 73 of the optical transceiver 35 converts the input optical signal into an electrical signal, and obtains the control signal C from the converted electrical signal.

Meanwhile, the optical transceiver 21-2 of the subscriber device **20-*k*2-2 receives the optical signal which has been transmitted through the optical route of the optical path P. The optical transceiver 21-2 converts the input optical signal into an electrical signal, and obtains the main signal M from the converted electrical signal. In addition, the optical transceiver 21-2 of the subscriber device 20-*k*2-2 converts an electrical main signal M addressed to the subscriber device 20-*k*1-1 into an optical signal and outputs the optical signal to the optical route of the optical path P. The optical transceiver 21-1 of the subscriber device 20-*k*1-1 receives an input of the optical signal which has been transmitted through the optical path P. The optical transceiver 21-1** converts the input optical signal into an electrical signal, and obtains the main signal M from the converted electrical signal.

The optical transceiver 35 included in the control signal reception unit 34 of the control unit 31-1 prevents light emitted from the light source 75 included in the transmitter 74 from being input to the optical fiber transmission line 43. For example, in a case where the transmitter 74 is the optical transceiver 70 illustrated in FIG. 2, the power feeding control unit 76 cuts off the current supply to the light source 75. The light emission of the light source 75 is turned off by the cutoff of the current supply. The light source 75 may be always turned off. Turning off the light emission of the light source 75 prevents interference between the signal light of the main signal M transmitted by the optical transceiver 21-2 and the light emitted by the light source 75 of the optical transceiver 35. In addition, in a case where the optical transceiver 35 is the optical transceiver 80 having a two-core configuration in which input and output optical ports are divided as illustrated in FIG. 3, the control signal reception unit 34 may open the output port 82 for outputting an optical signal. Specifically, the optical fiber transmission line 43-1 is not connected to the output port 82. Opening the output port 82 makes it possible to prevent interference between the signal light of the main signal M transmitted by the optical transceiver 21-2 and the light emitted from the optical transceiver 35.

In a case where a control signal is transmitted from the optical transceiver 35 to the subscriber device **20-*k*1-1, an optical modulator is inserted into the optical fiber transmission line 42-1. The optical transceiver 35 transmits the control signal to the optical modulator. The optical modulator modulates light carrying the main signal M transmitted from the optical transceiver 21-2 of the subscriber device 20-*k*2-2 to the optical transceiver 21-1 of the subscriber device 20-*k*1-1** with the control signal in a low frequency band. As a result, the control signal is superimposed as an AMCC signal.

A control signal transmitted from each of the subscriber devices 20 is, for example, an optical path switching request, a notification at the time of abnormality detection, or the like, but is not limited thereto, and may be any signal. A wavelength division multiplex (WDM)-passive optical network (PON) is assumed as an application area where a conventional AMCC-compatible optical transceiver is used. In this case, the control units 31 and the subscriber devices 20 have a Master-Slave relationship. In a case where an optical transceiver as a slave cannot receive a control signal from an optical transceiver as a master, the slave optical transceiver cannot transmit a control signal. Each of the optical transceivers 21 according to the present embodiment can transmit a control signal to the optical transceiver 35 even in a case where the optical transceiver 21 cannot receive a control signal from the optical transceiver 35 as a master. As described above, the present embodiment eliminates the Master-Slave relationship, and thus each of the optical transceivers 21 of the subscriber devices 20 can transmit a control signal regardless of whether or not a signal is received from an optical transceiver of another device. In addition, the optical transceiver 35 of the control signal reception unit 34 can receive a control signal regardless of the linkup state.

Note that, in the embodiment described above, the optical branching units 50 are provided on the optical fiber transmission lines 42, but the optical branching units 50 may be provided on the optical fiber transmission lines 41. As described above, the optical branching units 50 are only required to be provided on optical fiber transmission lines on which at least a part of the optical path P between the subscriber devices 20 is set.

According to the embodiment described above, in the optical communication system, after an optical path between subscriber devices is opened, an optical branching unit provided on an optical transmission line branches the power of an optical signal which has been transmitted from one of the subscriber devices and outputs the branched optical signal to a control unit. An optical transceiver of the control unit turns off light emission and receives the branched optical signal. Alternatively, in a case where the optical transceiver of the control unit has a two-core configuration, the optical transceiver receives an input of the optical signal which has been branched by the optical branching unit from an input port, and opens an output port that outputs an optical signal. With such a configuration, in the optical branching unit, light from the optical transceiver of the control unit is prevented from merging with a main signal transmitted and received between the subscriber devices, so that interference is prevented from occurring. Therefore, after the optical path is opened, a control signal can be transmitted from one of the subscriber devices to the control unit while the main signal is normally transmitted and received between the subscriber devices.

According to the embodiment described above, an optical communication system includes an optical switch, an optical branching unit, and an optical transmitting and receiving apparatus. For example, the optical transmitting and receiving apparatus is the optical transceiver 35. The optical switch inputs an optical signal which has been transmitted by a first optical communication device from a first port. The optical switch outputs the input optical signal from a second port connected to a first optical transmission line included in an optical route in which an optical path for transmitting the optical signal between the first optical communication device and a second optical communication device is set. For example, the first optical communication device and the second optical communication device are the subscriber devices **20-*k*1-1 and 20-*k*2-2. The optical branching unit branches a part of the optical signal from the first optical transmission line that transmits the optical signal output from the second port, and outputs the branched optical signal to a second optical transmission line. For example, the first optical transmission line is one of the optical fiber transmission lines 42, and the second optical transmission line is one of the optical fiber transmission lines 43**. The optical transmitting and receiving apparatus is connected to the optical branching unit by the second optical transmission line, and inputs the optical signal which has been branched by the optical branching unit. The optical transmitting and receiving apparatus includes a reception unit, a transmission unit, and a cutoff unit. The reception unit acquires a signal addressed to a destination different from the second optical communication device from the optical signal which has been input from the second optical transmission line. The transmission unit generates an optical signal using light emitted by a light source. The cutoff unit prevents the light emitted by the light source included in the transmission unit from being input to the second optical transmission line.

The cutoff unit is, for example, the power feeding control unit 76. The cutoff unit stops light emission of the light source. In addition, in a case where the optical transmitting and receiving apparatus includes an input port that inputs light from the second optical transmission line, and outputs the light to the reception unit, and an output port that outputs light which has been output by the transmission unit to the second optical transmission line, the cutoff unit may be the output port that is opened.

The first optical communication device may include an optical transmitting and receiving apparatus including: a reception unit that inputs an optical signal having been transmitted by a communication destination device, which is an optical communication device as a communication destination, from an optical transmission line, and receives the input optical signal; and a transmission unit that generates an optical signal carrying a first signal addressed to the communication destination device and a second signal addressed to a destination different from the communication destination device, and outputs the optical signal to the optical transmission line.

According to the present embodiment, it is possible to transmit a signal to a device different from a communication partner device while reducing an influence on a signal transmitted and received by use of an optical path to the communication partner device.

Although the embodiments of the present invention have been described above in detail with reference to the drawings, specific configurations are not limited to these embodiments, and include designs and the like without departing from the gist of the present invention.

REFERENCE SIGNS LIST

1 Optical communication system
10-1, 10-2 Optical switch
11 First port
12 Second port
20-1-1, 20-2-1, 20-3-1, 20-1-2, 20-2-2, 20-3-2 Subscriber device
21-1, 21-2 Optical transceiver
30 Control system
31-1, 31-2 Control unit
32 Subscriber device management control unit
33 Optical SW control unit
34 Control signal reception unit
35 Optical transceiver
41-1, 41-2, 42-1, 42-2, 43-1, 43-2 Optical fiber transmission line
50-1, 50-2 Optical branching unit
60 Optical communication network
70 Optical transceiver
71 Port
72 Separation unit
73 Receiver
74 Transmitter
75 Light source
76 Power feeding control unit
80 Optical transceiver
81 Input port
82 Output port

The invention claimed is:

1. An optical communication system comprising:

an optical switch that inputs, from a first port, an optical signal which has been transmitted by a first optical communication device and on which a main signal addressed to a second optical communication device and a control signal addressed to a destination different from the second optional communication device have been superimposed, and outputs the optical signal from a second port connected to a first optical transmission line included in an optical route in which an optical path between the first optical communication device and a second optical communication device is set;

an optical brancher that branches a part of the optical signal which has been transmitted through the first optical transmission line, and outputs the branched optical signal to a second optical transmission line; and an optical transmitting and receiving apparatus that inputs the optical signal which has been branched by the optical brancher from the second optical transmission line, the optical transmitting and receiving apparatus including:

a receiver that acquires the control signal from the optical signal which has been input from the second optical transmission line;

a transmitter that generates an optical signal by use of light emitted by a light source; and a cutoff unit that prevents the light emitted by the light source from being input to the second optical transmission line.

2. An optical transmitting and receiving apparatus comprising:

a receiver that (1) inputs, from a first port, an optical signal which has been obtained by an optical brancher branching a part of an optical signal which has been transmitted from a first optical communication device and on which a main signal addressed to a second optical communication device and a control signal addressed to a destination different from the second optional communication device have been superimposed, and (2) acquires the control signal from the input optical signal, the optical brancher being provided on a first optical transmission line included in an optical route in which an optical path between the first optical communication device and the second optical communication device is set;

a transmitter that generates an optical signal by use of light emitted by a light source; and a cutoff unit that prevents the light emitted by the light source from being input to the second optical transmission line.

3. The optical transmitting and receiving apparatus according to claim 2, wherein the cutoff unit stops light emission of the light source.

4. The optical transmitting and receiving apparatus according to claim 2, comprising:

an input port that inputs light from the second optical transmission line, and outputs the light to the receiver; and an output port that outputs light which has been output by the transmitter to the second optical transmission line, wherein the cutoff unit disconnects the light which has been output by the transmitter from the output port to the second optical transmission line.

5. An optical transmitting and receiving apparatus comprising:

a receiver that inputs an optical signal having been transmitted by a communication destination device, which is an optical communication device as a communication destination, from an optical transmission line, and receives the input optical signal; and a transmitter that generates an optical signal carrying a first signal addressed to the communication destination device and a second signal addressed to a notification destination device which is an optical communication device different from the communication destination device, the first signal and the second signal having been superimposed on the optical signal, and outputs the optical signal to the optical transmission line in a state where the optical transmitting and receiving apparatus cannot receive a signal from the notification destination device.

* * * * *